United States Patent
McKittrick et al.

(10) Patent No.: US 11,815,962 B2
(45) Date of Patent: Nov. 14, 2023

(54) CONFIGURING AN INFORMATION HANDLING SYSTEM (IHS) USING A KICKSTAND

(71) Applicant: Dell Products, L.P., Round Rock, TX (US)

(72) Inventors: Allen B. McKittrick, Cedar Park, TX (US); Pomin Shih, Taipei (TW); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/653,891

(22) Filed: Mar. 8, 2022

(65) Prior Publication Data

US 2023/0288966 A1    Sep. 14, 2023

(51) Int. Cl.
*G06F 1/20* (2006.01)
*G06F 1/16* (2006.01)
*G06F 1/324* (2019.01)

(52) U.S. Cl.
CPC ............. *G06F 1/166* (2013.01); *G06F 1/206* (2013.01); *G06F 1/324* (2013.01)

(58) Field of Classification Search
CPC .................................................. G06F 1/206
See application file for complete search history.

(56) References Cited

U.S. PATENT DOCUMENTS

| | | | | |
|---|---|---|---|---|
| 2015/0057830 A1* | 2/2015 | Slaby | ...................... | G06F 1/324 700/300 |
| 2015/0362962 A1* | 12/2015 | Lee | .......................... | G06F 1/182 361/679.21 |
| 2016/0173670 A1* | 6/2016 | Langhein | ................. | H04M 1/04 455/575.1 |
| 2016/0216742 A1* | 7/2016 | Lee | .......................... | F16M 11/38 |
| 2017/0010629 A1* | 1/2017 | Tsuchihashi | ............ | G06F 1/166 |
| 2021/0112673 A1* | 4/2021 | Huttula | .................. | G06F 1/1641 |
| 2021/0271304 A1* | 9/2021 | Chang | .................... | G06F 1/3203 |
| 2021/0311523 A1* | 10/2021 | Bai | ...................... | H05K 5/0226 |

FOREIGN PATENT DOCUMENTS

WO    WO-2022005455 A1 *    1/2022

* cited by examiner

*Primary Examiner* — Suresh Suryawanshi
(74) *Attorney, Agent, or Firm* — Fogarty LLP

(57) ABSTRACT

Embodiments of systems and methods for configuring an Information Handling System (IHS) using a kickstand are described. In some embodiments, an IHS may include a processor and a memory coupled to the processor, the memory having program instructions stored thereon that, upon execution, cause the IHS to identify a state of a kickstand coupled to the IHS and configure the IHS, at least in part, based upon the state.

20 Claims, 8 Drawing Sheets

CONFIGURING AN INFORMATION HANDLING SYSTEM (IHS) USING A KICKSTAND

FIELD

This disclosure relates generally to Information Handling Systems (IHSs), and more specifically, to systems and methods for configuring an IHS using a kickstand.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for configuring an Information Handling System (IHS) using a kickstand are described. In an illustrative, non-limiting embodiment, an IHS may include a processor and a memory coupled to the processor, the memory having program instructions stored thereon that, upon execution, cause the IHS to identify a state of a kickstand coupled to the IHS and configure the IHS, at least in part, based upon the state.

In some implementations, the processor may include an Embedded Controller (EC), and to identify the state, the program instructions, upon execution, may cause the EC to receive a signal from at least one of: a Hall sensor, a photo sensor, or an ultrasonic sensor. The IHS may include a vent located under the kickstand when the state is closed, such that the vent is configured to facilitate cooling of the IHS when the state is open. Moreover, to configure the IHS, the program instructions, upon execution, may cause the IHS to select at least one of a: thermal setting, fan speed setting, power consumption setting, turbo setting, network setting, display setting, battery charge or discharge setting, or cloud processing setting.

For example, the thermal setting may allow the IHS to operate at a first temperature when the state is open or a second temperature when the state is closed, and the first temperature may be greater than the second temperature. The fan speed setting may cause a fan to operate at a first speed when the state is open or a second speed when the state is closed, and the first speed may be smaller than the second speed.

The power consumption setting may allow the IHS to consume a first amount of power when the state is open or a second amount of power when the state is closed, and the first amount may be greater than the second amount. The turbo setting may allow a host processor to operate at a first frequency when the state is open or at a second frequency when the state is closed, and the first frequency may be greater than the second frequency. The network setting may allow a connection to a network when the state is open or block the connection to the network when the state is closed.

The display setting may include a first brightness when the state is open or a second brightness when the state is closed, and the first brightness may be greater than the second brightness. The battery charge or discharge setting may include a first rate of charge or discharge when the state is open or a second rate of charge or discharge when the state is closed, and the first rate may be greater than the second rate. The cloud processing setting may allow data to be processed by an application executed by the IHS when the state is open or require that the data be processed by a remote service when the state is closed.

The program instructions, upon execution, may also cause the IHS to configure the IHS, at least in part, in response to detection of at least one of: a temperature of the IHS above or below a threshold temperature, a temperature of a component of the IHS above or below another threshold temperature, a fan speed above or below a threshold speed, a time-left-to-charge a battery above or below a threshold time, a network bandwidth or throughout above or below a threshold bandwidth or throughout, or execution of an audio capture application.

Moreover, the program instructions, upon execution, further cause the IHS to instruct a user to change the state of the kickstand, at least in part, in response to the detection, and the IHS may be configured in response to the change.

In another illustrative, non-limiting embodiment, a hardware memory device may have program instructions stored thereon that, upon execution by a processor of an IHS, cause the IHS to detect execution of an audio capture application and instruct a user to open a kickstand, at least in part, in response to the detection.

The IHS may include a vent located under the kickstand when the kickstand is closed, and the vent may be configured to facilitate cooling of the IHS when the kickstand is open. The audio capture application may include an audio recording, video recording, audio call, or remote conferencing application.

In yet another illustrative, non-limiting embodiment, a method may include determining, by an IHS, that a temperature of the IHS is at or above a selected threshold and instructing a user to open a kickstand coupled to the IHS, at least in part, in response to the determination.

The IHS may include a vent located under the kickstand when the kickstand is closed, and the vent may be configured to facilitate cooling of the IHS when the kickstand is open. The method may also include, in response to a detection that the kickstand is open, changing at least one: thermal setting, fan speed setting, power consumption setting, turbo setting, network setting, display setting, battery charge or discharge setting, or cloud processing setting of the IHS.

BRIEF DESCRIPTION OF THE DRAWINGS

The present invention(s) is/are illustrated by way of example and is/are not limited by the accompanying figures, in which like references indicate similar elements. Elements

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. It should be appreciated that although certain embodiments are discussed in the context of a personal computing device, other embodiments may utilize various other types of IHSs.

Figure 1:
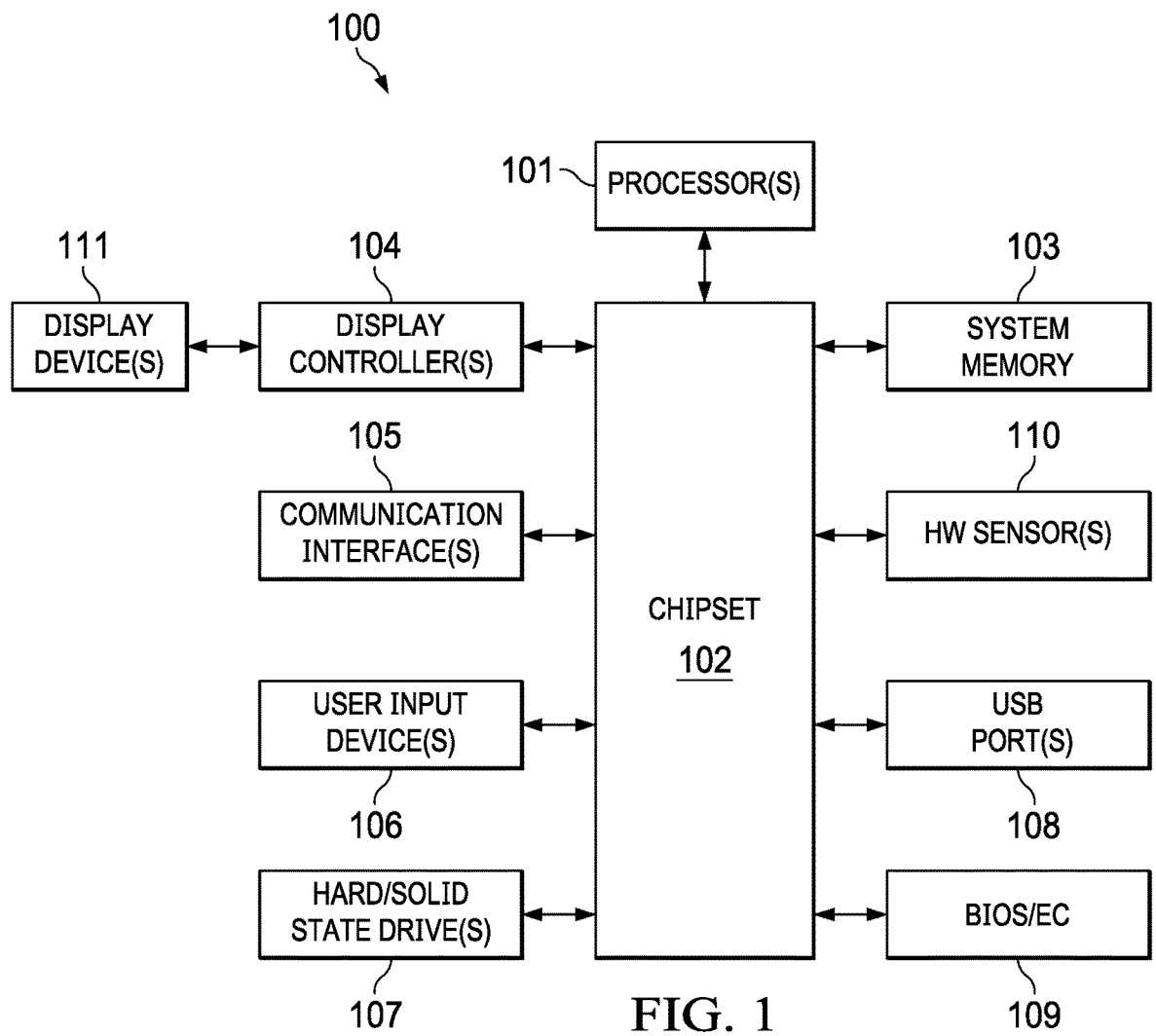
FIG. 1 is a diagram of an example of an Information Handling System (IHS), according to some embodiments.

FIG. 1 is a block diagram of components of IHS 100, according to some embodiments. As depicted, IHS 100 includes processor(s) 101. In various embodiments, IHS 100 may be a single-processor system, or a multi-processor system including two or more processors. Processor(s) 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor(s) 101. Chipset 102 (e.g., a Platform Controller Hub or "PCH," a Fusion Controller Hub or "FCH," etc.) may provide processor(s) 101 with access to several resources. In some cases, chipset 102 may utilize a QuickPath Interconnect (QPI) bus to communicate with processor(s) 101. Chipset 102 may also be coupled to communication interface(s) 105 to enable communications between IHS 100 and various wired and/or wireless networks, such as Ethernet, WiFi, BLUETOOTH, cellular or mobile networks (e.g., Code-division multiple access or "CDMA," Time-division multiple access or "TDMA," Long-Term Evolution or "LTE," 5G, etc.), satellite networks, or the like. In some cases, communication interface(s) 105 may be coupled to chipset 102 via a PCIe bus.

Chipset 102 may be coupled to display controller(s) 104, which may include one or more or Graphics Processor Unit(s) (GPUs) on a graphics bus, such as an Accelerated Graphics Port (AGP) or Peripheral Component Interconnect Express (PCIe) bus. As shown, display controller(s) 104 provide video or display signals to display device(s) 111. In some cases, display controller(s) 104 may also include a touchscreen controller that enables a user to provide touch inputs (e.g., finger, pen, etc.) directly on the surface of display device(s) 111. In other implementations, any number of display controller(s) 104 or display device(s) 111 may be used.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide processor(s) 101 and/or display controller(s) 104 with access to system memory 103. In various embodiments, system memory 103 may be implemented using any suitable technology, such as static RAM (SRAM), dynamic RAM (DRAM) or magnetic disks, or any nonvolatile/Flash-type memory, such as a solid-state drive (SSD) or the like.

Chipset 102 may also provide access to one or more hard disk and/or solid-state drive(s) 107. In certain embodiments, chipset 102 may also provide access to one or more optical drives or other removable-media drives. In certain embodiments, chipset 102 may further provide access to one or more Universal Serial Bus (USB) port(s) 108.

Chipset 102 may be coupled to one or more user input device(s) 106, for example, via a super I/O controller or the like. Examples of user input device(s) 106 include, but are not limited to, a keyboard, mouse, touchpad, stylus or pen, totem, etc. Each of user input device(s) 106 may include a respective controller (e.g., a touchpad may have its own touchpad controller) that interfaces with chipset 102 through a wired or wireless connection (e.g., via communication interface(s) 105).

In certain embodiments, chipset 102 may also provide an interface for communications with one or more hardware sensor(s) 110. Sensor(s) 110 may be disposed on or within the housing of IHS 100, and may include, but are not limited to: electric, magnetic, Hall, radio, optical, photo, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. The BIOS provides an abstraction layer that allows the OS to interface with certain hardware components that are utilized by IHS 100. Via the hardware abstraction layer provided by the BIOS, software stored in system memory 103 and executed by processor(s) 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

EC 109 may also implement operations for detecting certain changes to the physical configuration or posture of IHS 100. For instance, where IHS 100 as a 2-in-1 laptop/tablet form factor, EC 109 may receive inputs from a lid position or hinge angle sensor (e.g., sensor(s) 110), and it may use those inputs to determine: whether the two sides of IHS 100 have been latched together to a closed position or a tablet position, the magnitude of a hinge or lid angle, etc.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as a System-On-a-Chip (SoC). In certain embodiments, IHS 100 may be implemented as different types of portable IHSs including, but not limited to: laptops, tablets, smartphones, convertible devices (e.g., dual display IHSs), video game consoles, etc.

Figure 2:
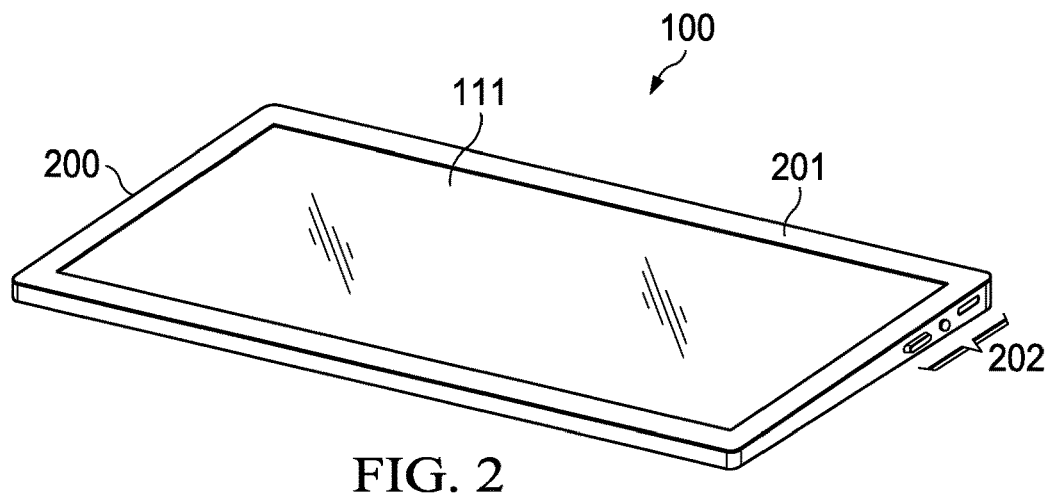
FIG. 2 is a diagram of an example of a portable IHS, according to some embodiments.

FIG. 2 is a diagram of an example of portable housing 200 for IHS 100 (e.g., a tablet device). The bottom surface of housing 200 rests on a planar surface, such as a tabletop, to provide a user with touchscreen display 111 with which to interact. In this example, housing 200 includes one or more openings 202 for power buttons, volume controls, audio/video jacks or ports, a charging port, etc. Housing 200 also includes bezel, edge, frame, or border 201 around at least a portion of its perimeter. In various implementations, housing 200 may generally be made of a metal or metallic alloy or material (e.g., magnesium, aluminum, etc.), at least in part, due to its heat conduction and RF shielding properties.

Figure 3:
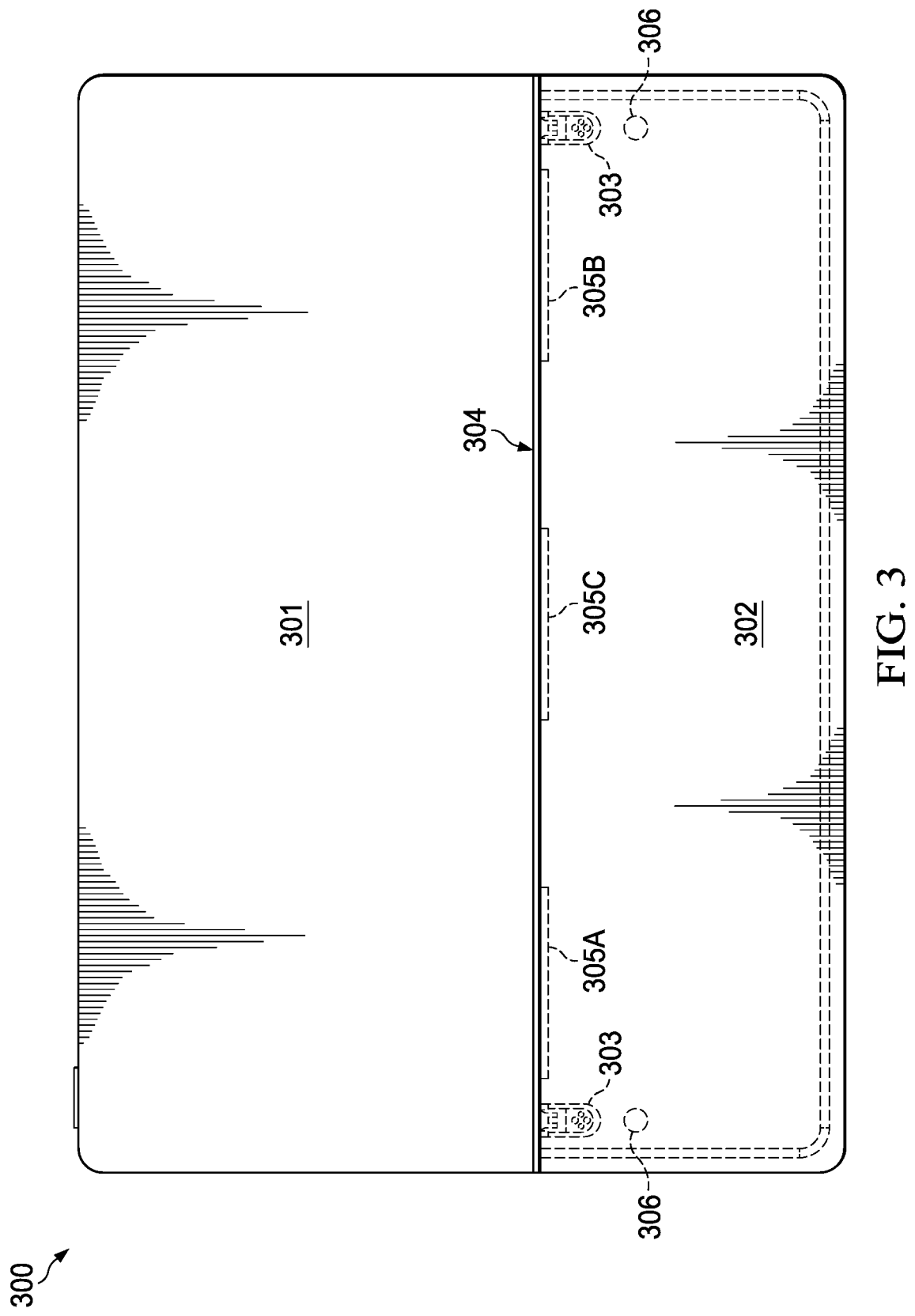
FIG. 3 is a diagram of an example of a housing with a kickstand in a closed position, according to some embodiments.
Figure 4:
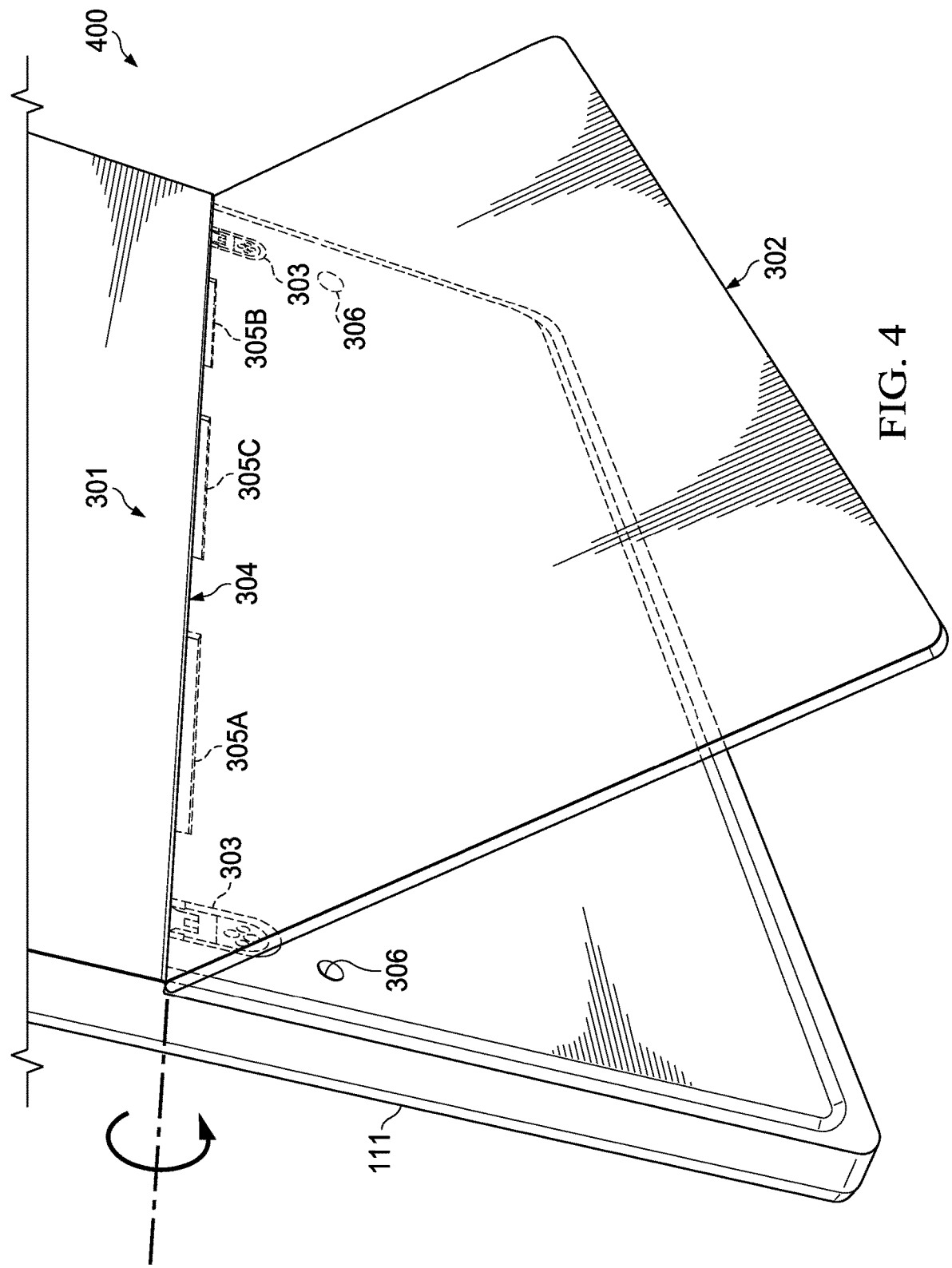
FIG. 4 is a diagram of an example of a housing with a kickstand in an open position, according to some embodiments.

FIGS. 3 and 4 are diagrams of examples of an IHS's housing showing kickstand 302 in different positions or states. Particularly, the back side of the IHS's housing (opposite display 111) includes fixed backplate 301 and kickstand 302. Kickstand 302 is coupled to backplate 301 via one or more hinges 303, such that kickstand 302 can swivel or rotate around axis 304 with respect to backplate 301 to move between its closed and open (i.e., deployed) positions.

In the closed configuration of FIG. 3, kickstand 302 is coplanar or parallel with respect to backplate 301, such that housing 200 may be placed horizontally on a flat surface (as in FIG. 2). In the open configuration of FIG. 4, kickstand 302 has been rotated away from backplate 301 around axis 304 so that it can keep the IHS's housing standing upright (at an angle) on a horizontal surface without having to lean against another object or be held by a person.

Backplate 301 may include one or more air vents 305A-C near axis 304. Vents 305A-C may be openings, gaps, slits, or holes in housing 200 that improve the IHS 100's ability to draw air from its surrounding environment, thus increasing air flow inside housing 200 and reducing the operating temperature or various IHS components. The number of air vents 305A-C, their distribution, and their position along axis 304 may be selected depending upon the physical configuration of IHS components within housing 200. In some implementations, vents 305A-C may include filters, screens, or grills to prevent foreign objects and dust from entering housing 200 without compromising airflow.

Figure 5:
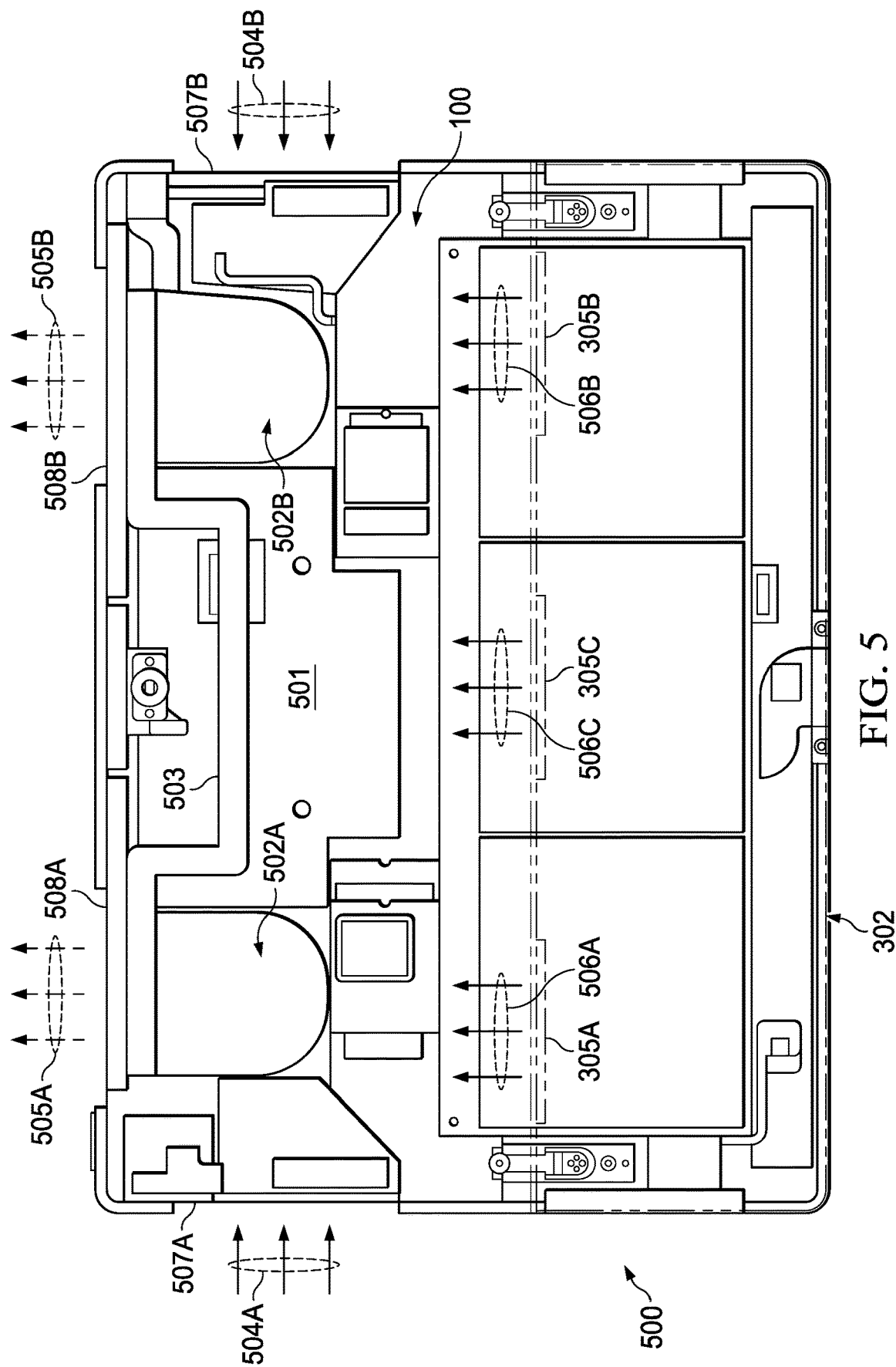
FIG. 5 is a diagram of an example of a cooling operation using vents disposed under a kickstand, according to some embodiments.

When kickstand 302 is open, vents 305A-C are operational and allow extra cool air inside housing 200, for example, as drawn by one or more fans (e.g., 502A and 502B in FIG. 5). When kickstand 302 is closed, however, vents 305A-C are blocked and IHS 100 may instead rely upon other vents (e.g., lateral vents 504A and 504B) to keep the interior of housing 200 below a selected temperature. The determination of whether kickstand 302 is open or closed may be made by EC 109 and/or processor(s) 101 based upon signals received from sensor(s) 306 (e.g., sensors 110, a Hall sensor, a photo sensor, etc.) disposed under kickstand 302.

In various embodiments, backplate 301 and/or kickstand 302 may be made of a metal or metallic alloy or material, similar to the rest of housing 200. Additionally, or alternatively, backplate 301 and/or kickstand 302 may be a plastic material or compound, such as, for example: Acrylonitrile Butadiene Styrene (ABS), High-density Polyethylene (HDPE), Polyether Ether Ketone (PEEK), polyamide (Nylon), polycarbonate (PC), polyethylene (PE), polyetherimide (PEI), polybutylene terephthalate (PBTR), polyoxymethylene (POM), polypropylene (PP), polypropiolactone (PPL), polyvinyl chloride (PVC), thermoplastics, etc. Alternatively, backplate 301 and/or kickstand 302 may be made of acrylic, silicone, glass, ceramic, etc.

FIG. 5 is a diagram of an example of cooling operation 500 using air vents disposed under kickstand 302. In this implementation, IHS 100 includes fans 502A and 502B symmetrically disposed around center region 501 of IHS 100. Center region 501 includes heat pipe or heat sink 503 coupled to the heat exchanging elements of fans 502A and 502B.

When kickstand 302 is closed, as shown in FIG. 3, lateral vents 507A and 507B may receive cool air 504A and 504B, respectively, and front vents 508A and 508B may output hot air 505A and 505B. Vents 305A-C are blocked by kickstand 302 and therefore do not allow a significant amount of cool air to enter the IHS housing.

When kickstand 302 is open or deployed, as shown in FIG. 4, lateral vents 507A and 507B still receive cool air 504A and 504B and front vents 508A and 508B continue to output hot air 505A and 505B. Furthermore, vents 305A-C now allow additional cool air 506A-C to flow into the IHS housing. Additional cool air 506A and 506B from vents 305A and 305B reaches fans 502A and 502B, respectively, and additional cool air 506C from vent 305C creates a partial radial airflow around heat pipe or heat sink 503.

In some embodiments, when kickstand 302 is open, increased airflow 506A-C due to vents 305A-C being unobstructed may allow IHS 100 to enter a high-performance mode whereby its components (e.g., processor(s) 101) are allowed to operate with greater frequencies, voltages, currents, speed, turbo, etc., thus reaching higher temperatures. Additionally, or alternatively, increased airflow 506A-C provided when vents 305A-C are unobstructed by kickstand 302 may allow IHS 100 to enter a quiet mode of operation with slower fan speeds and less noise or vibration. In some cases, the position of kickstand 302 (e.g., open or closed) may be used to control a mode of operation of IHS 100.

Figure 6:
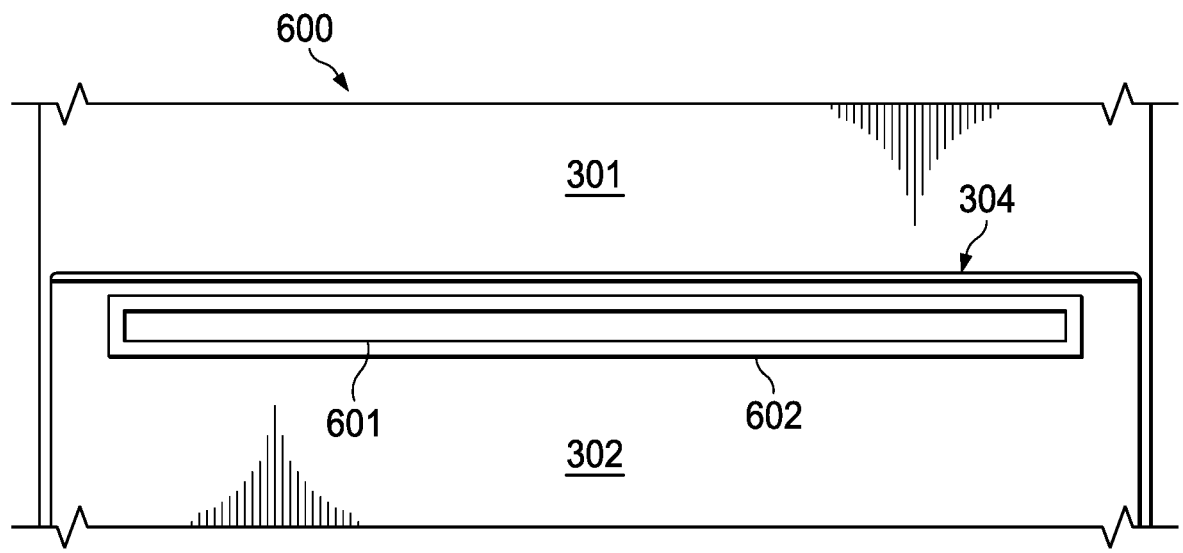
FIGS. 6-8 are diagrams of examples of various vent and kickstand opening combinations, according to some embodiments.
Figure 7:
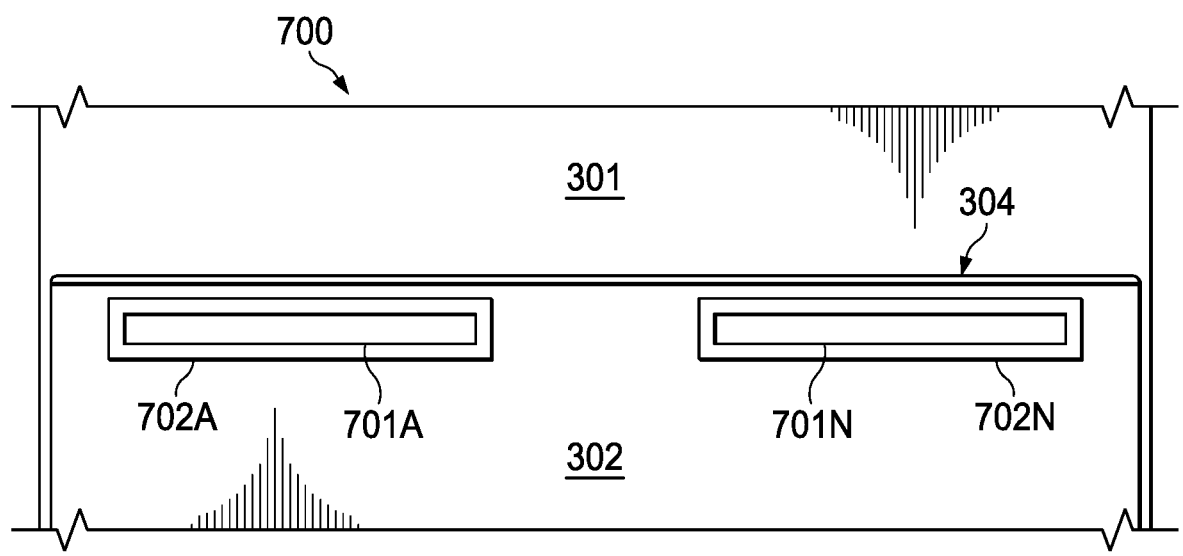
Figure 8:
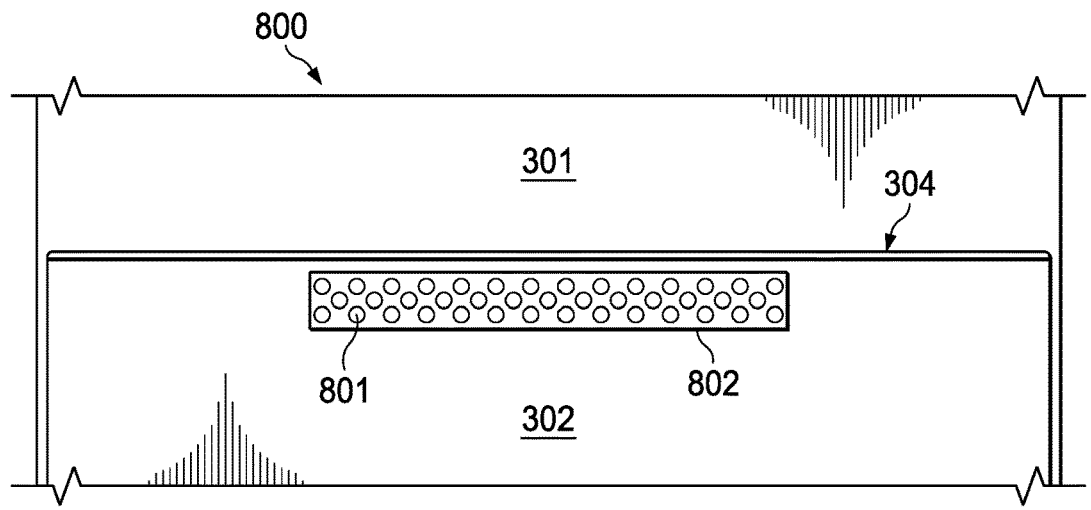

FIGS. 6-8 are diagrams of examples of vent and kickstand opening combinations 600-800. In combination 600, backplate 301 includes rectangular opening 601 having its long sides parallel to axis 304. In some cases, kickstand 302 may include rectangular opening 602 coextensive with, or larger than, opening 601. Opening 602 may be co-located with respect to opening 601 when kickstand 302 is in a closed configuration. In this manner, the additional airflow afforded by vent 601 may be present even when kickstand 302 is closed.

In combination 700, backplate 301 includes two or more discrete rectangular openings 701A and 701B having their long sides parallel to axis 304. In some cases, kickstand 302 may include rectangular openings 702A and 702B coextensive with, or larger than, openings 701A and 701B. Openings 702A and 702B may be co-located with respect to openings 701A and 701B when kickstand 302 is in a closed configuration. In this manner, the additional airflow afforded by vents 701A and 701B may be present even when kickstand 302 is closed.

In combination 800, backplate 301 includes perforated holes 801 disposed along axis 304. In some cases, kickstand 302 may include rectangular opening 802 coextensive with holes 801. Opening 802 may be co-located with respect to holes 801 when kickstand 302 is in a closed configuration. In this manner, the additional airflow afforded by vents 801 may be present even when kickstand 302 is closed.

Figure 9:
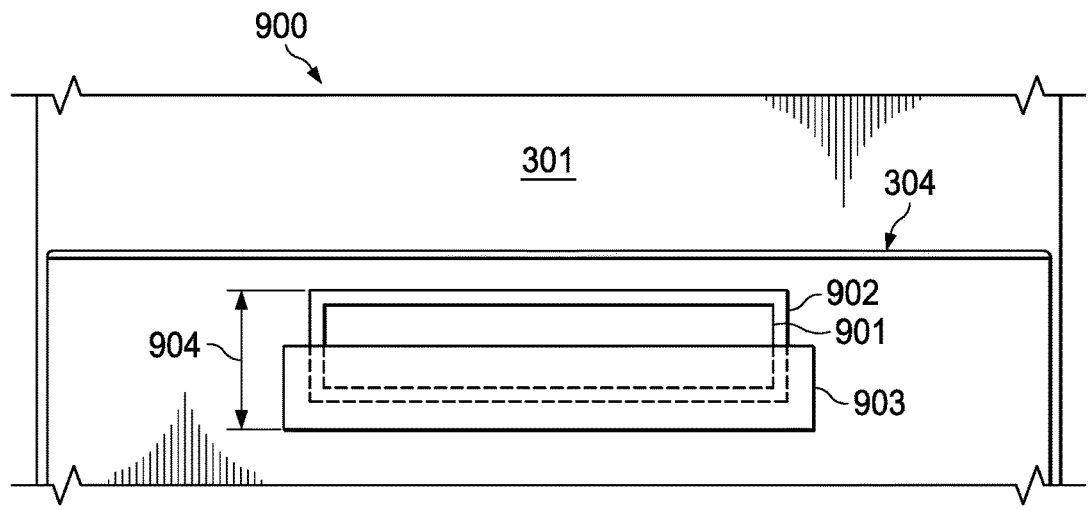
FIGS. 9 and 10 are diagrams of examples of partial kickstand opening implementations, according to some embodiments.
Figure 10:
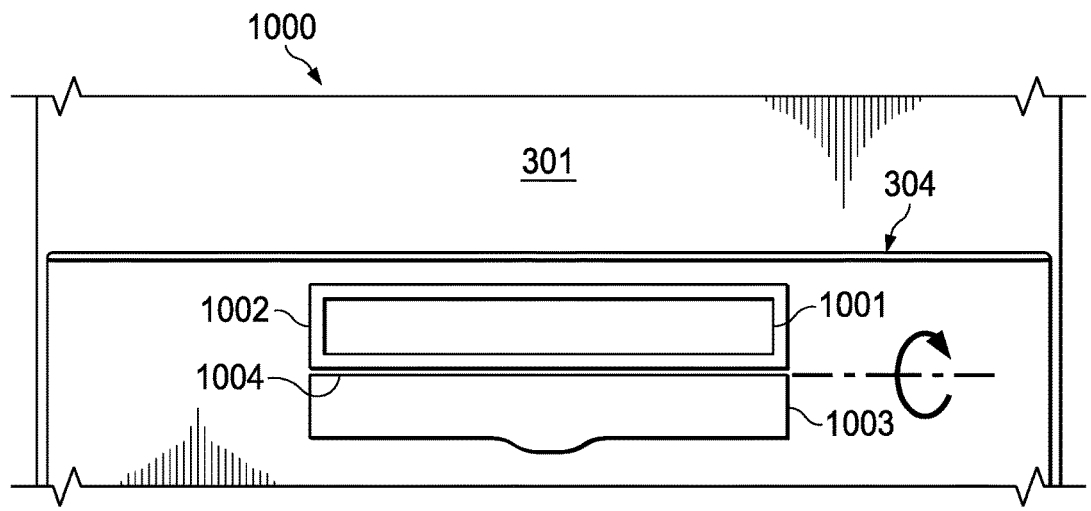

FIGS. 9 and 10 are diagrams of examples of partial kickstand opening implementations. Particularly, in FIG. 9, window portion 903 slides up and down in direction 904 to cover or uncover opening 902 overlying housing vent 901 on backplate 301 when kickstand 302 is closed. In FIG. 10, window portion 1003 flips open and closed around axis 1004 to cover or uncover opening 1002 overlying housing vent 1001 on backplate 301 when kickstand 302 is closed.

Vents 901 and 1001 may be located under kickstand 302 when at least a portion of the kickstand (e.g., other than window portions 903 or 1003) is in a closed position. Even when kickstand 302 is closed, however, window portions 903 and 1003 may be opened to allow airflow through vents 901 and 1001. In some cases, the determination of whether window portion 903 or 1003 is open or closed may be made by EC 109 and/or processor(s) 101 based upon signals received from sensor(s) 306 (e.g., sensors 110, a Hall sensor, a photo sensor, etc.) disposed under kickstand 302 and/or window portion 903 or 1003.

As such, systems and methods described herein may reduce an IHS housing's skin temperature by 1.4° C. or more. Additionally, or alternatively, these systems and methods may provide a 6% boost or greater in an IHS's thermal design power (TDP), which means the IHS can run cooler at higher TDPs. Additionally, or alternatively, these systems and methods may enable the design of thinner IHS housings.

In various embodiments, systems and methods described herein may provide a control algorithm based upon the execution of program instructions by EC 109 and/or processor(s) 101. Particularly, a control algorithm may be used to configure one or more aspects of IHS 100, at least in part, using kickstand 302. For example, a control algorithm may be implemented as an EC service. Additionally, or alternatively, a control algorithm may be implemented as an OS service, library, Application Programming Interface (API), or as part of a software application (e.g., an audio capture application, a video conferencing application, etc.).

These systems and methods may identify a state of kickstand 302 coupled to IHS 100, and configure IHS 100, at least in part, based upon the state. To identify the state of kickstand 302 (i.e., open or closed), these systems and methods may receive a signal from a Hall sensor, a photo sensor, or an ultrasonic sensor (e.g., sensor 306). Moreover, to configure IHS 100, these systems and methods may select one or more settings or operating parameters including, but not limited to, a thermal setting, fan speed setting, power consumption setting, turbo setting, network setting, display setting, battery charge or discharge setting, cloud processing setting, etc.

For example, a thermal setting may allow IHS 100 to operate at a first temperature when kickstand 302 is open, or a second temperature when kickstand 302 is closed, such that the first temperature is greater than the second temperature. Additionally, or alternatively, a fan speed setting may cause a fan to operate at a first speed when kickstand 302 is open or a second speed when kickstand 302 is closed. In some cases, the first speed may be smaller than the second speed.

Additionally, or alternatively, a power consumption setting may allow IHS 100 or a component thereof to consume a first amount of power when kickstand 302 is open or a second amount of power when kickstand 302 is closed. In some cases, the first amount may be greater than the second amount. Additionally, or alternatively, a turbo setting may allow a processor (e.g., processor(s) 101) to operate at a first frequency when the state of kickstand 302 is open or at a second frequency when kickstand 302 is closed. In some cases, the first frequency may be greater than the second frequency.

Additionally, or alternatively, a network setting may allow a connection to a network when kickstand 302 is open or block the connection to the network when kickstand 302 is closed. In some implementations, systems and methods described herein may provide a performance boost for 5G radios and millimeter (mm) Wave antennas by increasing the cooling and/or power capabilities available to IHS 100. Moreover, additional auxiliary antennas may be placed under the kickstand area to improve bandwidth and/or throughout when kickstand 302 is opened, due to there being no blockages by metal kickstand 302.

Additionally, or alternatively, a display setting may include a first brightness when kickstand 302 is open or a second brightness when kickstand 302 is closed. In some cases, the first brightness may be greater than the second brightness.

Additionally, or alternatively, a battery charge or discharge setting may include a first rate of charge or discharge when kickstand 302 is open or a second rate of charge or discharge when kickstand 302 is closed. In some cases, the first rate may be greater than the second rate. Additionally, or alternatively, a cloud processing setting may allow data to be processed by an application executed by IHS 100 when kickstand 302 is open or it may require that the data be processed by a remote service when kickstand 302 is closed.

In some implementations, systems and methods described herein may configure IHS 100, at least in part, in response to the detection of: a temperature of IHS 100 being above or below a threshold temperature, a temperature of a component of IHS 100 being above or below the same or a different threshold temperature, a fan speed being above or below a threshold speed, a time-left-to-charge an internal battery of IHS 100 being above or below a threshold time, a network connection having a bandwidth or throughout being above or below a threshold bandwidth or throughout, etc. Furthermore, systems and methods described herein may also configure IHS 100, at least in part, in response to execution of an audio/video capture application (e.g., an audio recording, video recording, audio call, remote conferencing application, etc.).

In some cases, in response to the detection, systems and methods described herein may instruct a user (e.g., via a Graphical User Interface or "GUI") to open or close kickstand 302 and may configure IHS 100 in response to the change.

Figure 11:
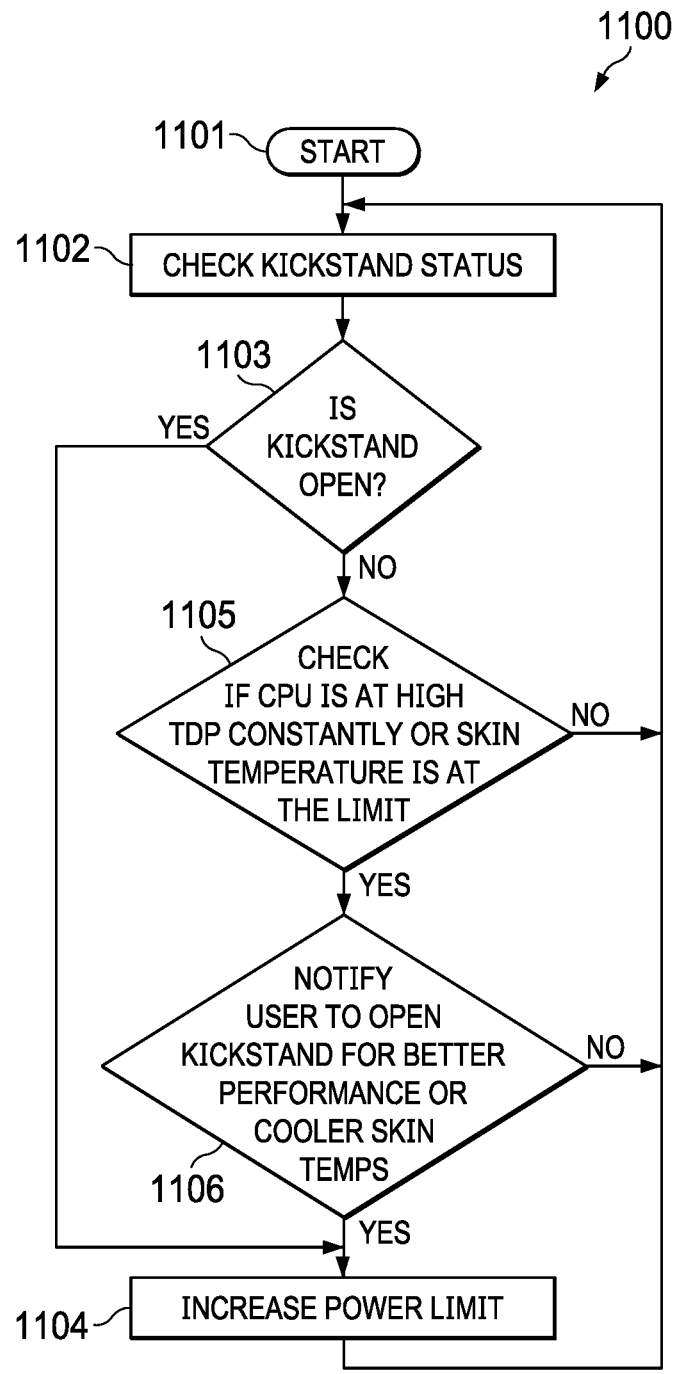
FIG. 11 is a flowchart of an example of a method for configuring a power consumption of an IHS based at least in part upon the state of a kickstand, according to some embodiments.

To illustrate an example of a control algorithm, FIG. 11 is a flowchart of method 1100 for configuring the power consumption of IHS 100 based, at least in part, upon the state of kickstand 302. In various embodiments, method 1100 may be performed, at least in part, by EC 109 and/or processors(s) 101.

Method 1100 begins at 1101. At 1102, method 1100 detects the status of kickstand 302. Particularly, at 1103, method 1100 determines whether kickstand 302 is open or closed. If method 1100 determines that kickstand 302 is open, at 1104 EC 109 and/or processor(s) 101 may modify a thermal table with higher power limits (e.g., PL1 and PL2), instantaneous and/or sustained, such that it allows IHS 100 to operate with the same or lower skin temperatures and/or fan noise level, but with greater performance because of the additional cooling capability resulting from more airflow entering housing 200 specifically from vent(s) that were obstructed when kickstand 302 was closed.

Conversely, if at 1103 method 1100 determines that kickstand 302 is closed, at 1105 method 1100 may check if processor(s) 101 are operating at a high TDP constantly, and/or if skin temperatures are at their limit. If not, control returns to 1102. Otherwise, at 1106, method 1100 may notify the user of IHS 100 to open kickstand 302 for better performance and/or lower temperatures. For example, a GUI window or pane may give a user a visual warning to inform them that CPU usage is at high levels, but that a higher performance and/or cooler skin temps may be obtained if kickstand 302 were opened. Then, if method 1100 determines that the user has opened kickstand 302, control passes to 1104.

Figure 12:
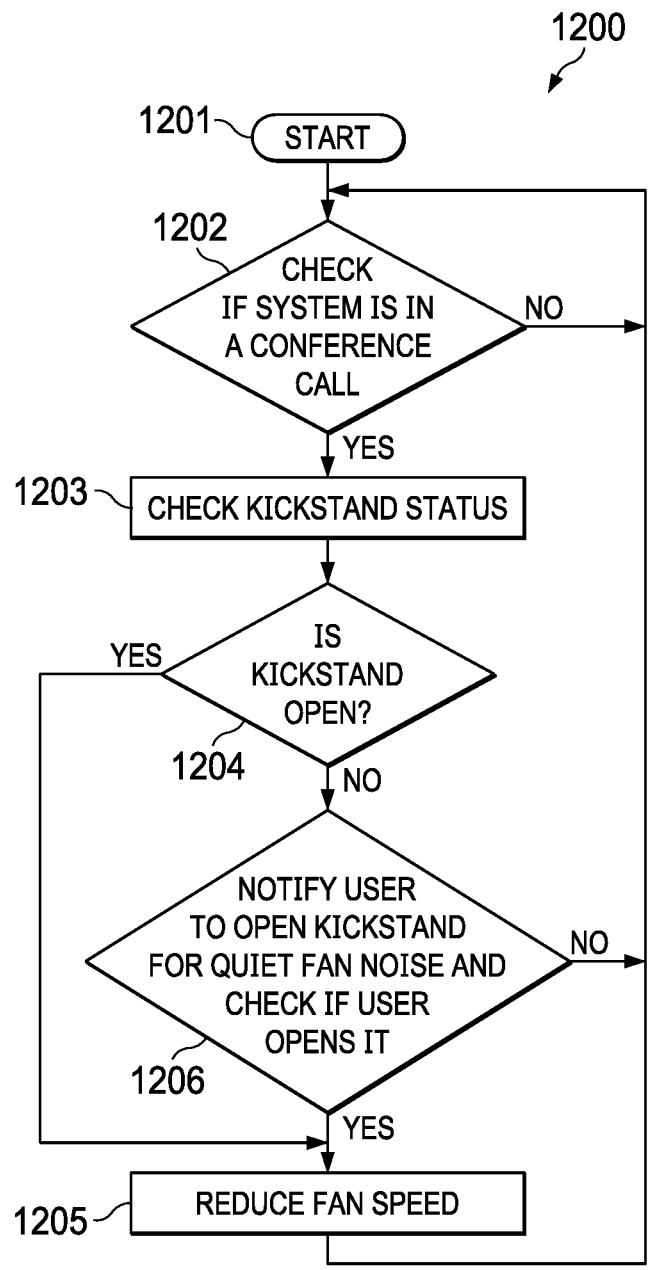
FIG. 12 is a flowchart of an example of a method for configuring a fan speed of an IHS based at least in part upon the state of a kickstand, according to some embodiments.

To illustrate another example of a control algorithm, FIG. 12 is a flowchart of method 1200 for configuring a fan speed of IHS 100 based, at least in part, upon the state of kickstand 302. In various embodiments, method 1200 may be performed, at least in part, by EC 109 and/or processors(s) 101.

Method 1200 begins at 1201. At 1202, method 1200 determines if IHS 100 is executing a video or audio call application, or another type of audio capture application that would benefit from less ambient noise (e.g., from fans 502A and 502B). If so, at 1203, method 1200 detects the status of kickstand 302. Particularly, at 1204, method 1200 determines whether kickstand 302 is open or closed.

If at 1204 method 1200 determines that kickstand 302 is open, at 1205 EC 109 and/or processor(s) 101 may modify a fan speed table that it allows IHS 100 (and housing 200) to reduce its fan noise levels without sacrificing performance because of the additional cooling capability resulting from more airflow entering housing 200 specifically from vent(s) that were obstructed when kickstand 302 was closed.

Conversely, if at 1204 method 1100 determines that kickstand 302 is closed, at 1206 method 1200 may notify the user of IHS 100 via a GUI to open kickstand 302 during the execution of the audio capture application for quieter fan operation. Then, if method 1200 determines that the user has opened kickstand 302, control passes to 1205.

As such, various systems and methods described herein may integrate a kickstand's deployment status with dynamic power tuning technology for performance boost and cooler skin temperatures. Additionally, or alternatively, these systems and methods may integrate a kickstand's deployment status with audio/video conference detection and EC fan control for quiet fan operation during the conference calls.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a processor; and
   a memory coupled to the processor, the memory having program instructions stored thereon that, upon execution, cause the IHS to:
   identify a state of a kickstand coupled to the IHS;
   configure the IHS, at least in part, based upon the state;
   detect of at least one of: a temperature of the IHS above or below a threshold temperature, a temperature of a component of the IHS above or below another threshold temperature, a fan speed above or below a threshold speed, a time-left-to-charge a battery above or below a threshold time, a network bandwidth or throughout above or below a threshold bandwidth or throughout, or an execution of an audio capture application; and
   instruct a user to change the state of the kickstand, at least in part, in response to the detection.

2. The IHS of claim 1, wherein the processor comprises an Embedded Controller (EC), and wherein to identify the state, the program instructions, upon execution, further cause the EC to receive a signal from at least one of: a Hall sensor, a photo sensor, or an ultrasonic sensor.

3. The IHS of claim 1, further comprising a vent located under the kickstand when the state is closed, wherein the vent is configured to facilitate cooling of the IHS when the state is open.

4. The IHS of claim 1, wherein to configure the IHS, the program instructions, upon execution, cause the IHS to select at least one of a: thermal setting, fan speed setting, power consumption setting, turbo setting, network setting, display setting, battery charge or discharge setting, or cloud processing setting.

5. The IHS of claim 4, wherein the thermal setting allows the IHS to operate at a first temperature when the state is open or a second temperature when the state is closed, and wherein the first temperature is greater than the second temperature.

6. The IHS of claim 4, wherein the fan speed setting causes a fan to operate at a first speed when the state is open or a second speed when the state is closed, and wherein the first speed is smaller than the second speed.

7. The IHS of claim 4, wherein the power consumption setting allows the IHS to consume a first amount of power when the state is open or a second amount of power when the state is closed, and wherein the first amount is greater than the second amount.

8. The IHS of claim 4, wherein the turbo setting allows a host processor to operate at a first frequency when the state is open or at a second frequency when the state is closed, and wherein the first frequency is greater than the second frequency.

9. The IHS of claim 4, wherein the network setting allows a connection to a network when the state is open or blocks the connection to the network when the state is closed.

10. The IHS of claim 4, wherein the display setting comprises a first brightness when the state is open or a second brightness when the state is closed, and wherein the first brightness is greater than the second brightness.

11. The IHS of claim 4, wherein the battery charge or discharge setting comprises a first rate of charge or discharge when the state is open or a second rate of charge or discharge when the state is closed, and wherein the first rate is greater than the second rate.

12. The IHS of claim 4, wherein the cloud processing setting allows data to be processed by an application executed by the IHS when the state is open or requires that the data be processed by a remote service when the state is closed.

13. The IHS of claim 1, wherein the program instructions, upon execution, cause the IHS to configure the IHS, at least in part, in response to the detection.

14. The IHS of claim 1, wherein the IHS is configured in response to the change of the state of the kickstand.

15. A hardware memory device having program instructions stored thereon that, upon execution by a processor of an Information Handling System (IHS), cause the IHS to:
   detect execution of an audio capture application; and
   instruct a user to open a kickstand, at least in part, in response to the detection of the execution of the audio capture application.

16. The hardware memory device of claim 15, wherein the IHS comprises a vent located under the kickstand when the kickstand is closed, and wherein the vent is configured to facilitate cooling of the IHS when the kickstand is open.

17. The hardware memory device of claim 15, wherein the audio capture application comprises an audio recording, video recording, audio call, or remote conferencing application.

18. A method, comprising:
    determining, by an Information Handling System (IHS), that a temperature of the IHS is at or above a selected threshold; and instructing a user to open a kickstand coupled to the IHS, at least in part, in response to the determination that the temperature of the IHS is at or above the selected threshold.

19. The method of claim 18, wherein the IHS comprises a vent located under the kickstand when the kickstand is closed, and wherein the vent is configured to facilitate cooling of the IHS when the kickstand is open.

20. The method of claim 18, further comprising, in response to a detection that the kickstand is open, changing at least one: thermal setting, fan speed setting, power consumption setting, turbo setting, network setting, display setting, battery charge or discharge setting, or cloud processing setting of the IHS.

\* \* \* \* \*